United States Statutory Invention Registration [19]

[11] Reg. Number: H385

Bol [43] Published: Dec. 1, 1987

[54] SHALE COAGULATING LOW SOLIDS DRILLING FLUID

[75] Inventor: Gerard M. Bol, GD Rijswijk, Netherlands

[73] Assignee: Shell Oil Company, Houston, Tex.

[21] Appl. No.: 757,236

[22] Filed: Jul. 22, 1985

[30] Foreign Application Priority Data

Sep. 11, 1984 [GB] United Kingdom ..... 8422912

[51] Int. Cl.[4] ..... C09K 7/02
[52] U.S. Cl. ..... 252/8.51; 252/8.514
[58] Field of Search ..... 252/8.5 A, 8.5 C

[56] References Cited

U.S. PATENT DOCUMENTS

| | | | |
|---|---|---|---|
| 3,023,162 | 2/1962 | Fordyce et al. | 210/734 |
| 3,025,236 | 3/1962 | Barrett et al. | 252/8.51 |
| 3,040,820 | 6/1962 | Gallus | 252/8.51 X |
| 3,198,268 | 8/1965 | Lindblom et al. | 175/72 |
| 3,278,501 | 10/1966 | Bailey et al. | 210/734 X |
| 3,346,488 | 10/1967 | Lyons et al. | 252/8.5 |
| 3,880,764 | 4/1975 | Donham | 252/8.5 |
| 4,151,096 | 4/1979 | Jackson | 252/8.5 |
| 4,299,710 | 11/1981 | Dupre et al. | 252/8.5 |
| 4,366,074 | 12/1982 | McLaughlin et al. | 252/8.5 X |
| 4,384,044 | 5/1983 | Kim et al. | 435/101 |
| 4,422,947 | 12/1983 | Dorsey et al. | 252/8.5 |
| 4,425,241 | 1/1984 | Swanson | 252/8.5 |
| 4,440,649 | 4/1984 | Loftin et al. | 252/8.5 |
| 4,518,510 | 5/1985 | Gleason et al. | 252/8.5 |
| 4,554,081 | 11/1985 | Borchardt et al. | 252/8.5 |

FOREIGN PATENT DOCUMENTS 1539064 1/1979 United Kingdom .

*Primary Examiner*—Herbert B. Guynn

[57] ABSTRACT

A drilling fluid capable of coagulating shale particles, when used for well drilling, completion or the like, comprising a low solids fluid containing polymeric viscosifiers and polymeric fluid loss reducers as well as a high molecular weight organic polycationic polymeric coagulant and flocculant.

6 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SHALE COAGULATING LOW SOLIDS DRILLING FLUID

BACKGROUND OF THE INVENTION

The present invention relates to a low solids drilling fluid. More particularly, it relates to such a fluid containing polymeric viscosifiers and fluid loss reducers and a certain class of organic polycationic polymeric coagulating and flocculating material.

When drilling subterranean wells such as, for example, oil or gas wells, the rotary drilling method is commonly employed. The rotary drilling method utilizes a bit attached to a drill stem, and a drilling fluid or "mud" which is circulated through the drill stem to the bottom of the borehole where it is ejected through small openings in the drill bit. The fluid is then returned to the surface through the annular space between the drill stem and the borehole wall, or casing if one has been installed. Upon reaching the surface, the drilling fluid or "mud" is ordinarily treated to remove cuttings obtained from the borehole, and is then recirculated.

Drilling fluids serve many functions, and should therefore possess a number of desirable physical and rheological properties. For example, the viscosity of a drilling fluid should be sufficient to permit it to effectively transport bit cuttings from the bottom of the borehole into surrounding formations by depositing on the wall of the hole a thin but substantially impervious filter cake. In addition, a drilling fluid should be able to hold solids in suspension, preventing their return to the bottom of the hole when the circulation is reduced or temporarily interrupted. This property can be obtained by utilizing additives which will impart a gel structure to the drilling fluid to increase viscosities. The gel structure, however, is preferably such that cuttings can be removed from the drilling fluid by passing the fluid through filtration equipment such as a shale shaker and/or sand cyclones prior to recirculating the fluid to the drill bit. A drilling fluid must also exert pressure on the surrounding formations, thus preventing possible collapse of the borehole or influx of highly pressurized oil or gas in the formation. Finally, a drilling fluid should serve as a lubricating and cooling agent for the drill string and the bit.

Drilling of easily dispersible formations such as shales, marls and chalks often presents a problem in mud solids control. Drilled solids disintegrate in the drilling fluid while being transported to surface and the fines thus created are very difficult to remove. A buildup of fines is the consequence and leads to an increased viscosity of the drilling fluid and a decreased rate of penetration of the drilling operation. Ultimately, mud dilution is required to recondition the mud or drilling fluid.

Accepted methods to combat drilled solids disintegration are the application of encapsulating polymers and/or inhibiting salts. These chemicals partially prevent disintegration of cuttings and so delay the buildup of fines. In easily dispersible formations however, mud dilution will be inevitable in the end.

Instead of, or in addition to preventing drilled solids disintegration, aggregation of fines could well be beneficial to solids removable.

An objective of the present invention is to assess the possibilities of flocculants for the improvement of solids removal from drilling fluids.

In particular, the removal of flocculated shale fines over sieves is an object of the present invention.

Application of coagulants and/or flocculants serve the purpose of destabilizing a suspension. Discrete aggregates are formed, that are easier to separate from the fluid by settling, sieving, filtration, flotation, centrifugation or other separation methods.

SUMMARY OF THE INVENTION

The present invention relates to an aqueous, shale coagulating, drilling fluid in which the viscosifier and the fluid loss reducer are polymeric materials which are capable of providing those functions and the coagulant and flocculant is an organic polycationic polymer consisting of a quaternary polymer containing chains of nitrogen, phosphorous or sulfur quaternary cationic atoms surrounded by organic radicals of the group aliphatic, cyclaliphatic and aromatic radicals.

DESCRIPTION OF THE INVENTION

As used herein, the term "high molecular weight" refers to a molecular weight in the range from 500,000 to 15,000,000. And, the terms "flocculation" and "coagulation" are defined as follows.

Coagulation is used for the aggregation process, brought about primarily by a reduction of the repulsive potential of the electrical double layer of shale particles. Flocculation is used for the formation of a random loose floc structure, usually brought about by high molecular weight polymers. It should be noted that some polyelectrolytes act both as a coagulant and a flocculant.

The use of ferri and aluminum salts as coagulants is known and widely applied. High molecular weight polyelectrolytes however, have proven to be more efficient in many applications.

The choice of a coagulant and/or flocculant for improvement of a certain separation process depends on (1) the type of separation, (2) type, and (3) concentration of suspended solids and (4) the nature (composition) of the suspending fluid. Especially in case of polyelectrolytes, it is very difficult to base such a choice on general theoretical considerations.

Solid/liquid separation with the aid of coagulants and/or flocculants is a common process in many industries, e.g. waste water treatment, water clarification, mineral ore separation, paper making, oil/water separation . . . etc . . .

The characteristic demands of drilling fluids are the following:

i. Selectivity

Often, drilling fluids contain two types of solids; those added on purpose for increasing viscosity, fluid loss reduction and density improvement, and formation solids, produced while drilling. The organic polycationic polymeric flocculant or coagulant applied according to the invention enhances the removal of drilled solids, but does not interact with soluble mud additive(s).

ii. Compatibility

Soluble mud additives and flocculants and/or coagulants should be fully compatible. The flocculating properties should not be affected by mud additives and rheological and fluid loss properties not by the flocculant and/or coagulant. In the present formulation comprising high molecular weight polycationic polymers, such antagonistic interaction does not exist.

iii. Floc strength and size

Flocs are formed either downhole, where fines are created, if the flocculant is an intrinsic componant of the fluid, or in the flowline if the flocculant is added there at a balanced rate. In both cases, a certain amount of viscous shear is exerted on the flocs. Further mechanical shear takes place on sieves (shale shakers) being used for regenerating the circulating drilling fluid. Flocculant application is only successful if the flocs stay reasonably intact during the transport and separation process. Another important parameter is floc size. If only very small flocs are formed, a gelly-like substance is developed, plugging off the sieves. The present high molecular weight organic polycationic polymeric flocculant is able to create reasonably strong and big flocs, being several millimeters in diameter.

iv. Dispersion

During drilling of dispersible formations, big cuttings will be produced. A flocculant should not enhance the dispersion of these cuttings and should preferably be compatible with cutting encapsulating polymers, preferably present in the drilling fluid. A combination of cutting encapsulation and fines aggregation would, of course, give the optimal drilling fluid for easily dispersing formations. Also, erosion and/or swelling of the borehole wall should not be enhanced by a flocculant or a coagulant.

The present high molecular weight cationic polymer flocculants and coagulants meet these requirements. In principle, the present polycationic flocculants can be used for aggregation of many types of fine suspended solids, such as shales, marls and chalks.

Traditionally, bentonite or other clay solids have been utilized to increase the viscosity of the drilling fluid. Today however, there is a growing belief that bentonite or clay suspensions have serious limitations as a drilling fluid base. The rheology of bentonite-based fluids is such that the hydraulic horsepower delivered to the bit at a given surface pressure is significantly less than with drilling fluids containing certain polymers.

The lower viscosity and/or solids content of the polymer muds result in a faster bit penetration rate which, in turn, decreases the drilling costs. Therefore, the drilling fluid according to the invention contains at least one polymeric viscosifier including, for example: cellulose compounds such as carboxyethyl cellulose, carboxymethyl cellulose, carboxymethyl hydroxyethyl cellulose, hydroxyalkyl celluloses, alkylhydroxyalkyl celluloses, alkyl celluloses, and alkylcarboxyalkyl celluloses; polyacrylamides; natural galactomannans such as guar gum, locust bean gum, and gums derived from endosperm seeds; starches and various other polysaccharides, such as the heteropolysaccharide obtained from Pseudomonas sp. NCIB 11592, known by its registered trade name Shellflo-S. The concentration of the polymeric viscosifier(s) is preferably in the range from 1 to 50 g polymeric viscosifier per liter of drilling fluid.

As mentioned hereinbefore the drilling fluid according to the invention contains at least one polymeric fluid loss reducer. Suitable polymeric fluid loss reducers are (pregelantinized) starch, gums, polyanionic cellulosic polymer, sodiumpolyacrylonitrile, sodiumcarboxymethyl cellulose and sodiumpolyacrylate. Preferably, the drilling fluid contains from 1 to 50 g polymeric fluid loss reducer per liter of drilling fluid.

Advantageously in the drilling fluid, according to the invention, at least one encapsulating polymer is present in order to improve the separation of fine drilled solids from the circulating drilling fluid during the drilling operation with the aid of sieves, e.g. the so-called shale shakers. Preferably, the encapsulating polymer content of the drilling fluid is in the range from 0.1 to 10 g/liter. Examples of suitable encapsulating polymers are hydrolyzed polyacrylamide, polyanionic cellulose and heteropolysaccharide. A very much preferred encapsulating polymer to be added to the present drilling fluid is a heteropolysaccharide obtained from Pseudomonas sp. NCIB 11592, known by its registered trade name Shellflo-S.

Any suitable method of application can be used regarding the present drilling fluid. The essential feature is contact between the clay particles to be treated and a polymer-containing carrier fluid. A preferred carrier fluid is water or an aqueous media. The water can contain other ingredients which do not substantially interfere with dispersion or dissolution of the polymer in the media. The water carrier may be gelled or thickened for certain applications. Such ingredients or additives can include salts, mineral acids, low molecular weight organic acids, cationic or nonionic surfactants (anionic surfactants can be used with a mutual solvent) or wetting agents.

The drilling fluid according to the invention comprises basically a certain class of organic polycationic polymers. The polymers have a molecular weight between $5\times10^5$ and $15\times10^6$. The organic polycationic polymer should be present in the carrier fluid in a concentration within the range of about 10 to 5000 ppm wt of organic polycationic polymeric coagulant and/or flocculant. Lower and higher concentrations can be used but are generally not practical.

A preferred aqueous carrier fluid is a saline solution containing about 0–40% salt up to about saturation limits at the applicable temperature. The preferred salt concentration is about 2–12% by weight; however, concentrations up to about 35% can be used, as well as fresh water. The salt can be an alkali metal salt, alkaline earth metal salt, ammonium salt or combinations thereof. These include the halides, sulphates, carbonates, oxides or combinations thereof. The halides of potassium, sodium, magnesium, calcium, zinc and combinations thereof are preferred due to economics and solubility. Conventional additives such as inhibitors, surfactants, coupling agents, wetting agents and others can be used where desirable and especially where the organic polycationic polymer is used with conventional treatment procedures. The drilling fluid preferably contains salts or acids which will shrink or prevent swelling.

When oil and gas wells are cased, it is necessary to perforate the casing or to drill out a section of open hole below the casing in order to complete the well and start production. A hazard in this well completion operation is that the fluid in the well bore will damage the permeability because it often rushes into the formation when it is opened up. The well can be completed as an open hole, or by perforating using shaped charges or bullets. As a component in the completion fluid, organic polycationic polymers have a purpose of preventing damage to permeability should pressure in the well be higher than formation pressure and the well fluids enter the formation.

The organic polycationic polymers present in the drilling fluid according to this invention can generally be considered quaternary polymers with nitrogen or phosphorous as the quaternary or cationic atom with an aliphatic, cycloaliphatic or aromatic chain. Trivalent or tertiary sulphur can substitute for the quaternary nitrogen or phosphorous in the polymers. The cationic atom to carbon atom ratio is preferably about 1:2 to 1:36 and the molecular weight is above about 1,000. Examples of these polycationic polymers include polyethyleneamines, polyvinylpyridinium salts, or polyallylammonium salts.

Preferred organic polycationic polymers of this invention can be characterized and illustrated by the following formula and examples.

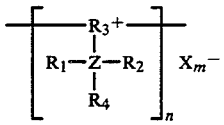

wherein $R_1$ is an organic aliphatic cycloaliphatic, or aromatic radical containing 2–40 carbon atoms or a hydrogen radical and when $R_1$ is cycloaliphatic Z and $R_2$ can be in the ring;

$R_2$, $R_3$ and $R_4$ are organic radicals independently defined as $R_1$ containing 0–6 carbons atoms and 0–2 oxygen or nitrogen atoms; when $R_1$ is cycloaliphatic it may or may not be in the organic polycationic polymer chain; when Z is sulphur $R_4$ is not present;

Z is a cation such as those derived from nitrogen, phosphorous or sulphur;

X is an anion such as halide, nitrate, sulphate, bisulphate, carbonate, hydroxide, borates, oxides, azides, cyanides phosphates, etc.;

n is an integer equal to the number of monomer units in the polymer required to give a molecular weight in the range of about $5\times10^5$–$15\times10^6$;

m is an integer equal to the number of anions required to maintain electronic neutrality.

The organic or hydrocarbon radicals can be linear, branched or cycloaliphatic radicals, aromatic radicals, unsaturated radicals, substituted radicals or combinations thereof. The organic radicals can be homoaliphatic or heteroaliphatic, i.e. may or may not contain other atoms such as oxygen or nitrogen. The organic radicals can be homocyclic or heterocyclic, i.e., may or may not contain other atoms such as oxygen or nitrogen. Thus, the organic radicals can be substituted or unsubstituted alkyl, aryl or combinations thereof with each radical having 0–40 and preferably 0–6 carbon atoms.

The above class of organic polycationic polymers can be divided into the following preferred subclasses:

A. Alkyl Polycationic Polymers

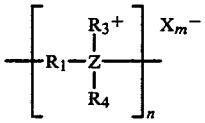

wherein $R_1$ is a divalent normal or branched chain alkylene group containing 2–40 carbon atoms, preferable range 2–12 carbon atoms;

$R_2$ is contained with $R_1$;

$R_3$ is normal or branched alkyl or hydrogen containing 0–6 carbon atoms and preferably 1–3 carbon atoms;

$R_4$ is radical defined the same as $R_3$, but it may or may not be identical to $R_3$, e.g., $R_3$=methyl and $R_4$=propyl; when Z is sulphur $R_4$ is not present;

Z is a cation such as those derived from nitrogen, phosphorous, or sulphur;

X is an anion such as halide, nitrate, sulphate, hydroxide, etc;

n is an integer equal to the number of monomer units in the polymer required to give a molecular weight in the range of about $5\times10^5$–$15\times10^6$; and m is an equal to the number of anions required to aintain electronic neutrality.

One preferred group of this subclass is applied in a carrier fluid at a pH greater than about 4, especially in the range of about 5–9. In another preferred group when Z is nitrogen, at least one of $R_3$ and $R_4$ is not hydrogen, methyl, ethyl or propyl.

B. Heteroaliphatic Polycationic Polymers

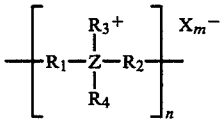

wherein $R_1$ is arylene, alkylene, arylalkylene, alkylarylene, alkenylene or combinations thereof. When $R_1$ is alkyl it contains or has appended one or more hetero atoms or groups. When $R_1$ is aryl, or alkylaryl it can contain or have appended one or more hetero atoms or groups. $R_1$ can be normal-hetero-alkyl or it can be branched extensively through the hetero-atoms or groups. The hetero-atoms or groups may be ethylenic (—CH=CH—, acetylenic (—C≡C—), aryl, or nitrogen phosphorous, or sulphur in regular covalent bonding, partially oxidized, e.g., sulphone, or in the onium state, other hetero atoms or groups may be oxygen, hydroxyl, carbonyl, or covalent halogen. With the exception of ethylenic, or aryl, a hetero atom or group is not bonded directly to Z.

$R_2$ is an unsubstituted alkyl or it can be defined as $R_1$ but it is not required to be identical to $R_1$. $R_2$ can be included in $R_1$.

$R_3$ can be alkyl containing 1–6 carbon atoms, hydrogen or it can be defined as a monovalent form of $R_1$ but it is not required to be identical to $R_1$.

$R_4$ can be defined as $R_3$ but it is not required to be identical to $R_3$. When Z is sulphur $R_4$ is not present.

Z is a cation such as those derived from nitrogen, phosphorous or sulphur.

X is an anion such as halide, nitrate, sulphate, hydroxide etc.

n is an integer equal to the number of monomer units in the polymer required to give a polymer with a molecular weight in the range of about $5\times10^5$–$15\times10^6$.

m is an integer equal to the number of anions required to maintain electronic neutrality.

The polymer can branch through $R_1$, $R_2$, $R_3$, or $R_4$ in such manner that the main polymer chain is an arbitrary choice and $R_1$, $R_2$, $R_3$, and $R_4$ are arbitrary choices around any particular Z.

A typical branched polymer is shown as follows:

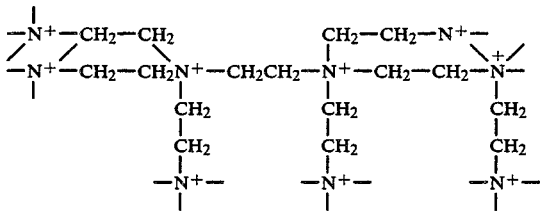

The anions are omitted for clarity.

C. Polycationic Polymers Containing Rings

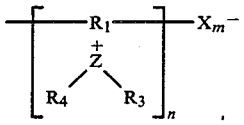

$R_1$ is alkylene, unsaturated alkylene, substituted alkylene, or substituted unsaturated alkylene forming a heterocyclic ring including Z. The heterocyclic ring can be aliphatic, olefinic or aromatic depending on the degree of unsaturation. Substitutions can be alkyl, alkenyl, alkynyl, or aryl branches or substitutions can be hetero atoms or hetero groups contained in the ring, appended to the ring, or appended to the branches. Hetero atoms or groups can be phosphorous or sulphur (in regular covalent, onium or oxidized state, e.g. phosphate or sulphone), nitrogen, oxygen, hydroxyl, carbonyl, or covalent halogen, a restriction being that the hetero atom or group is not bonded directly to Z.

$R_2$ is included in $R_1$.

$R_3$ is a hydrogen radical or an organic radical containing 1–6 carbon atoms and 0–2 oxygen or nitrogen atoms. In the case of certain aryl polycationic polymers, with monomer units bonded through Z and elsewhere on the aryl, $R_3$ may be absent.

$R_4$ is defined the same as $R_3$ but is not required to be identical with $R_3$. When Z is sulphur $R_4$ is absent.

Z is a cation such as those derived from nitrogen, phosphorous or sulphur.

X is an anion such as halide, nitrate, sulphate, hydroxide, etc.

n is an integer equal to the number of monomer units in the polymer required to give a polymer with a molecular weight in the range of about $5\times10^5$–$15\times10^6$.

m is an integer equal to the number of anions required to maintain electronic neutrality.

Bonds containing monomer units may be through Z, other hetero atoms, $R_1$ (1 or 2 sites), or branches on $R_1$.

D. Pendent Polycationic Polymers

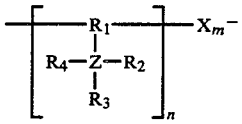

wherein $R_1$ can be alkylene, alkenylene, alkynylene, arylene, and linkages or branches of the these in combinations. $R_1$ can contain hetero atoms or groups in the pendent linkage, on branch chains, on or in the polymer linkage. Hetero atoms or groups can be phosphorous or sulphur (in regular covalent, onium, or partially oxidized state, e.g., sulphone), nitrogen oxygen, hydroxyl, carbonyl, or covalent halogen, a restriction being that the hetero atom or group is not bonded directly to Z. The pendent linkage can range from a simple bond to branch of $R_1$ several atoms long connecting Z to the polymer chain.

$R_2$, $R_3$ and $R_4$ can be defined independently as alkyl, alkenyl, aryl or combinations thereof or can be hydrogen, except that they unlike $R_1$ are not in the polymer chain. When $R_2$ is aryl including Z in a heterocyclic ring and/or when Z is sulphur $R_3$ or $R_4$ may not exist.

Z is a cation such as those derived from nitrogen, phosphorus, or sulphur. In one preferred class not more than two of the three R groups can be hydrogen. In another preferred class when $R_2$ is aryl and contains nitrogen, the aryl ring has at least one substituent or contains one other hetero atom or group.

X is an anion such as halide, nitrate, sulphate, hydroxide, etc.

n is an integer equal to the number of monomer units in the polymer required to give a polymer with a molecular weight in the range of about $5\times10^5$–$6\times10^6$.

m is an integer equal to the number of anions required to maintain electronic neutrality.

The following are examples of the preferred polycationic polymer classes having repeating polymer units such as those illustrated below.

(1) where Z is sulphur, a sulphonium polymer

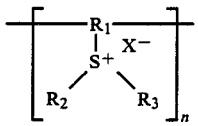

and one example is derived from the monomer $H_2C{=}CHCO_2CH_2CH_2S(CH_3)_2Cl$, poly-2-acryloxyethyldimethylsulfoniumchloride; $R_1$=2-acryloxyethyl, $R_2$=methyl, $R_3$=methyl, $R_4$=non-existent, and X=chloride.

The above formula and R groups show a polymer wherein the R groups are not hydrogen.

(2) where Z is phosphorous, a phosphonium polymer

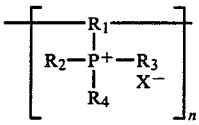

and an example monomer is

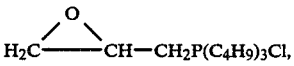

glycidyltributylphosphoniumchloride; $R_1$=glycidyl, $R_2$=butyl, $R_3$=butyl, $R_4$=butyl; and X is chloride;

The above example shows a polymer wherein the cation Z is pendent and not in the polymer chain and at least three of the R groups are the same.

(3) where Z is nitrogen, quaternary ammonium polymers;

(3a) integral alkyl quaternary, example polymer:

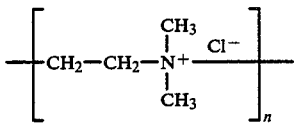

polydimethylethyleneammoniumchloride, example polymer:

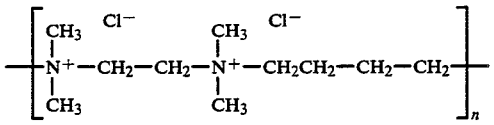

the condensation product of N,N,N',N'-tetramethylethylenediamine and 1,4 dichlorobutane.

The above examples show polymers wherein the R groups are not hydrogen; wherein the cation Z is in the polymer chain and in the second example is also in one of the R groups; wherein two of the R groups are the same and two of the R groups are different; and wherein at least two of the R groups are linear aliphatic radicals with not more than one and/or two different radicals in the polymer chain.

(3b) Integral quaternary in cyclic ring, example polymer:

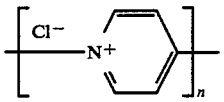

the condensation product of 4-chloropyridine;

(3c) integral alkyl, aryl quaternary, example polymer:

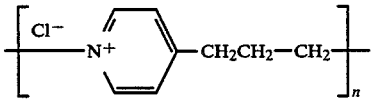

the condensation product of ·1-(4-pyridyl)-3-chloropropane; another example polymer:

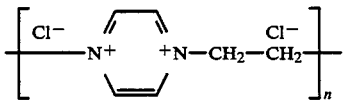

the condensation product of pyrazine and 1,2-ethylene dichloride;

The above examples show polymers with one or more cationic Z groups in the polymer chain and in an aromatic radical which is also in the polymer chain with two different R radicals which are also in the polymer chain. Thus, the examples show heterocyclic aromatic and linear R groups which are in the polymer chain.

(3d) Pendent alkyl quaternary, example polymer:

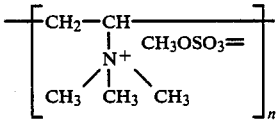

polyvinyltrimethylammonium methylsulphate. The above example shows a polymer with a pendent cationic Z radical and pendent R groups which are the same but different from the R group in the polymer chain; thus, Z and three of the R groups are not in the polymer chain.

(3e) Pendent quaternary on cyclic backbone, example polymer:

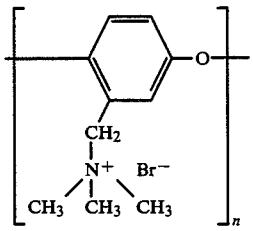

The above example shows a polymer with aromatic and heteroradicals in the polymer chain, a pendent cationic Z radical and three R groups which are aliphatic and not hydrogen or not in the polymer chain.

(3f) Pendent quaternary on carbocyclic ring, example polymer:

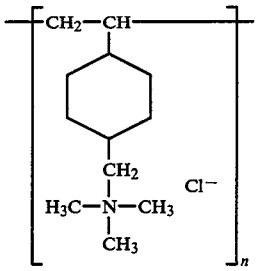

polyvinyl-4benzyltrimethylammoniumchloride;

(3g) Pendant quaternary nitrogen on polymethacrylate backbone, example polymer:

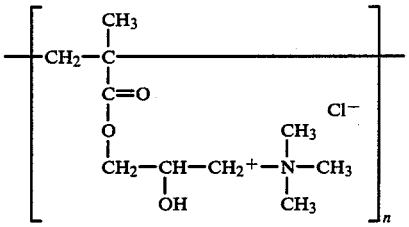

poly(3-methacryloxy-2-hydroxypropyltrimethylammonium chloride). The above example shows different R groups with one in the polymer chain and three aliphatic R groups with one containing a cationic Z group and hetero atoms which are not in the polymer chain.

Another example polymer:

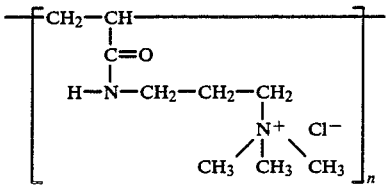

poly(acrylamide-3-propyltrimethylammoniumchloride). The above example shows a polymer with pendent R groups and cations which are not in the polymer chain, aliphatic R groups with one in the polymer chain, and a pendent group containing hetero atoms and more than one Z group.

(3h) Quaternary nitrogen in pendent heterocyclic ring, example polymers:

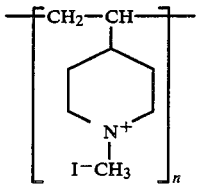

poly-4 vinyl-N-methylpyridiniumiodide; The above formula shows a polymer with a pendent hetero aromatic radical which is also a cationic radical and they are not in the organic polycationic polymer chain.

(3i) Heterocyclic ring containing quaternary nitrogen, example polymers:

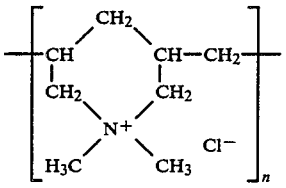

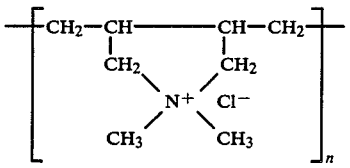

polymer of diallyldimethylammoniumchloride.

The above formulae show a pendent Z cation and pendent aliphatic R groups with at least two of the R groups having the same number of carbon atoms and with two R groups having the same number of carbon atoms and being linear aliphatic radicals in the polymer chain. The formulae also show heterocyclic aliphatic groups in the polymer chain which also have pendent portions.

The above classes and subclasses of polycationic polymers can be substantially linear or branched. Examples (3a), (3b) and (3c) can be considered substantially linear polymers. Examples (1), (2), (3d), (3e), (3f), (3g), (3h) and (3i) can be considered branched. These examples show branching through at least one organic radical such as examples (1), (2), (3d), (3e), (3f), (3g), (3h) and (3i) and through a cation radical such as example (3a). Also examples (3d), (3e), (3f), (3g), (3h) and (3i) can be considered to have branching through pendent cation radicals or hetero groups.

The drilling fluid according to the invention can also be used as completion fluid or workover fluid.

The following example serves to illustrate various embodiments of the invention and enable one skilled in the art to practice this invention.

EXAMPLE

A number of flocculants were tested in various concentrations, in solutions of viscosifiers and fluid-loss reducers. Qualitative tests were carried out in measuring cyclinders, noting:

occurrence of flocculation and type of floc
settling of the flocs
turbidity of the supernatant.

The results of these tests were used for primary screening of flocculants. The best performing flocculants were used for further testing. Suspensions were flocculated and moderately sheared by hot rolling or peddle stirring for two hours. Subsequently the flocs were sieved off and dried, and the recovery determined. Tests were done in solutions of single additives and mixed solutions of viscosifiers and fluid-loss reducers.

The effect of flocculant and shale fines concentration was extensively evaluated in Shellflo-S solutions (Shellflo-S is a registered trade mark). A number of tests was carried out to compare the effect of flocculants in fresh water and KCl, NaCL and $CaCl_2$ solutions, containing Shellflo-S.

The combined effect of encapsulating and flocculating polymers was investigated in suspensions of shale fines and cuttings.

In all tests dispersed, flocculated or encapsulated shale was removed from the suspension over either 150 or 180 μm sieves and the fraction retained on the sieves was determined.

In the flocculant depletion tests, the thus obtained filtrate was again used as flocculating mud.

The shale used in all tests, either as fines or cuttings, is Pierre shale, an outcrop material from Utah (U.S.A.). Table 1 shows the composition of this shale. Table 2 summarises all flocculants used with suppliers and, if known, a description of their chemical nature.

In Table 3, a summary is given of all mud additives used, again also mentioning suppliers and chemical compositions.

Table 4 shows the results of tests on the compatibility of flocculants and coagulants, with mud additives. Incompatibility (precipitation) with some of the mud additives is considered to be too risky for a chemical to be incorporated in drilling fluids that will be used on a routine basis.

Table 5 gives the results of measuring cylinder flocculation tests. It shows which mud additive/flocculant combinations are able to flocculate a Pierre shale suspension and which are not.

The anionic flocculant SS-100 (hydrolysed polyacrylamide) shows a poor performance.

From Table 5 can be concluded that the cationic XZ-86243 performs very well.

Table 6 shows the recovery of Pierre shale fines over 100 mesh sieves. The main conclusion from these results is that a significant improvement in solids removal can be attained by addition of a cationic high molecular weight flocculant.

Table 7 shows the results of flocculation tests in various fluids. Since it was known in this stage that anionic polymers perform poorly, they were excluded from this test series. More cationic polymers were included instead.

The presence of salts alone, did not cause flocculation. The main conclusions are:

The *low* (MW<50,000) and *medium* (50,000<MW<500,000) *molecular weight* flocculants (C 581, P.P.C.) show a *poor* performance in all solutions. *High molecular weight* ($5\times10^5<MW<15\times10^6$) is clearly required for effective solids removal improvement.

The Nalco flocculants 4625, 4725 and 4780, although used in combination with an activator are ineffective in fresh water but perform well to excellent in brines.

For use in drilling operations XZ-86243 is preferred for *fresh water* systems; Nalco 4625 and 4780 (and perhaps others from this product series) *for brines* and C-420 *for both.*

Table 8 shows the effect of the flocculant concentration on solids removal for C-420, XZ-86243 and Nalco 4625. C-420 is effective, in the whole range from 10 to 1000 ppm wt; XZ-86243 shows increasing performance with increasing concentration. The water content of the retained fines clearly increases with flocculant concentration for the two effective products. This inforamtion is of particular relevance for solid waste disposal.

Variation of the fines content from 0.1 to 5.0% w/v had no effect on recoveries. Addition of 500 ppm C-420 and XZ-86243 to Shellflo-S/Pierre shale suspensions always resulted in a recovery between 90 and 100%.

In most tests viscosities of solutions with and without flocculant were measured and also the viscosity of the filtrate. Addition of up to 500 ppm flocculant always caused a slight change in rheology, but never more than approximately±5%. The viscosity of the filtrates was generally lower than that of the initial mud, but always within a range of approximately 10%. Taking the high solids load and normal adsorption of polymeric mud additives into account, this value is according to expectation.

Table 9 shows the results of combined application of cutting encapsulators and flocculants on fines and cutting very. Clearly no antagonistic effect occurs between the two. Again XZ-86243 shows to be a very effective flocculant and Shellflo-S and SS-100 excellent cutting inhibitors.

Table 10 shows the results of the triaxial shale tests c.f. Darley, H. C. H., "A Laboratory Investigation of Borehole Stability" J. Pat. Tech., Jul. 1969, 883–893 AIME, 246. The cationic flocculant XZ-86243 is clearly shown to be inert as far as borehole stability is concerned.

TABLE 1

| Composition of Pierre shale fraction < 2 μm: 53.6% (= clay content) Composition of the clay fraction | |
|---|---|
| montmorillonite | 40% w/w |
| mixed layers | 0 w/w |
| illite | 50 w/w |
| chlorite | 5 w/w |
| kaolinite | 5 w/w |

TABLE 2

Description of flocculants and coagulants

| Product | Supplier | Charge* | Mol. weight | Description |
|---|---|---|---|---|
| SS-100 | I.D.F. | −−− | high ($>\frac{1}{2}\cdot10^6$) | 30–40% Hydrolysed polyacrylamide |
| XZ-86243 | Dow. Chem. | ++ | " | Polyacrylamide with quarternary ammonium groups |
| C-420 | Cyanamid | + | " | Polyacrylamide with cationic groups |
| C-436 | " | ++ | " | " |
| C-461 | " | +++ | " | " |
| C-470 | " | +++ | " | " |
| C-581 | " | + | medium** | Amine condensation polymer |
| Nalco-4625 | Nalco | + | high ($>\frac{1}{2}\cdot10^6$) | Cationic polymer |
| Nalco-4780 | " | +++ | " | " |
| Nalco-4725 | " | ++ | very high ($>10^6$) | " |
| P.P.C. | EGA(Aldrich) | +++ | medium** | Poly(n,n-dimethyl-3,5-dimethylenepiperidiniumchloride) |
| CP-35 | Dow. Chem. | ++ | high ($>\frac{1}{2}\cdot10^6$) | Modified cationic polyacrylamide |
| CP-50 | " | ++ | " | " |

*−/+ indicate sign and relative Density of the charge
**50,000 < MW < 500,000

TABLE 3

Description of mud additives

| Mud additive | Description |
|---|---|
| Flocgel | starch |
| Stabilose | slightly carboxylated starch |
| CMC | carboxy methyl cellulose |
| HEC | hydroxy ethyl cellulose |
| Drispac | polyanionic cellulose |
| Shellflo-S | polysaccharide (succinoglycan) |

TABLE 4

Results of mud additives/flocculant compatibility

| Mud additive | flocculant/coagulant SS-100 | CP-35 | XZ-86243 |
|---|---|---|---|
| Stabilose (10)* | + | + | + |
| HEC (4) | + | + | + |
| CMC-HV (10) | + | + | + |
| Shellflo-S (1) | + | + | + |
| SS-100 (2) | + | + | + |
| Drispac (10) | + | + | + |

*between brackets: mud additive concentration in g/liter
+: compatible
flocculants were tested in 10, 100 and 1000 ppm wt concentrations

TABLE 5

Flocculating efficiency of various flocculants in mud additive solutions (measuring cylinder tests)

| Mud additive | flocculant (500 ppm wt) SS-100 (anionic) | CP-35 (cationic) | XZ-86243 (cationic) |
|---|---|---|---|
| Water | + | + | + |
| Stabilose (10)* | − | + | + |
| Flocgel (10) | + | + | + |
| CMC-HV (10) | − | − | + |
| CMC-LV (10) | − | − | + |
| HEC (1) | − | + | + |
| Drispac (5) | − | − | + |

TABLE 5-continued

Flocculating efficiency of various flocculants in mud additive solutions (measuring cylinder tests)

| Mud additive | flocculant (500 ppm wt) SS-100 (anionic) | CP-35 (cationic) | XZ-86243 (cationic) |
|---|---|---|---|
| Enorflo-S (1) | − | + | + |

+ = flocculating
− = not flocculating
*Between brackets: concentration in g/liter

TABLE 6

Recovery of Pierre shale fines by means of flocculants

| Mud additive | RECOVERY (%) OVER 100 mesh SIEVE No flocculant | XZ-86243 500 ppm wt |
|---|---|---|
| Stabilose (1)* | 36 | 78 |
| Flocgel (1) | 26 | 65 |
| CMC-HV (1) | 27 | 99 |
| CMC-LV (1) | 26 | 97 |
| Drispac (0.5) | 46 | 98 |
| Enorflo-S (0.1) | 41 | 96 |
| HEC (0.4) | 88 | 93 |
| Stabilose (1) CMC-HV (1) ** | 38 | 83 |

* = between brackets: concentration in % w/w.
** = flocculant concentration = 100 ppm wt fines concentration 40 g/l

TABLE 9

Combined effect of flocculants and inhibitors on fines and cutting recovery

| Inhibitor (0.2%) | Flocculant (500 ppm wt) | Shale (5% wt) | Recovery (%) |
|---|---|---|---|
| Shellflo-S | XZ-86243 | fines | 98 |
| " | " | cuttings | 93 |
| " | Mg-205 | fines | 66 |
| " | " | cuttings | 91 |
| SS-100 | XZ-86243 | fines | 91 |
| " | " | cuttings | 94 |
| " | MG-205 | fines | 57 |
| " | " | cuttings | 94 |

conditioning: hot rolling at 60 ° C. for 24 hrs.
base mud: 10 g/l Stabilose + 10 g/l CMC-HV.

TABLE 10

The effect of the cationic flocculant XZ-86243 on borehole stability in a reconstituted Pierre shale sample

| Additive | Erosion (%) | Failure time (min) | Failure type |
|---|---|---|---|
| — | 17 | 599 | collapse |
| XZ-86243 (0.2%) | 19 | 705 | " |
| XZ-86243 (0.2%) + KCl (10%) | 5 | no failure | no failure |

confining pressure: 225 bar.
base mud: 10 g/l CMC-LV (low-viscosity carboxymethylcellulose) + 10 g/l CMC-HV (high-viscosity carboxymethylcellulose)

TABLE 7

The effect of flocculants on recovery of Pierre shale fines over 80 mesh sieves

| Flocculant | RECOVERY OVER 80 mesh SIEVES (180 μm) no salt 0 | no salt 500 ppm wt | NaCl (10% wt) 500 ppm wt | KCl (10% wt) 500 ppm wt | $CaCl_2$ (10% wt) 500 ppm wt |
|---|---|---|---|---|---|
| C-420 | 35 | 94 | 88 | 81 | 92 |
| C-436 | — | 69 | 65 | 65 | 70 |
| C-461 | — | x | 64 | 55 | 58 |
| C-470 | <10 | 88 | 76 | 49 | 61 |
| C-581 | <10 | x | 26 | 27 | 39 |
| Nalco-4625 | <10 | 10 | 99 | 99 | 99 |
| Nalco-4725 | <10 | <10 | 69 | | 73 |
| Nalco-4780 | 2 | 11 | 91 | 95 | 89 |
| XZ-86243 | 2 | 94 | 73 | 56 | 70 |
| P.P.C. | <10 | x | 30 | 33 | 43 |

base mud:
fresh water
3 g/liter Shellflo-S
50 g/liter fines
—: no date available
x: incompatible; precipitation of polymer

TABLE 8

The effect of flocculant concentration on removal of Pierre shale fines over 80 mesh sieves

| Flocculant | Concentration (ppm wt) | recovery over 80 mesh sieve (%) | water content retained fines (%) |
|---|---|---|---|
| C-420 | 0 | <10 | — |
| " | 10 | 93 | 12 |
| " | 100 | 61 | 15 |
| " | 1000 | 96 | 28 |
| XZ-86243 | 0 | 12 | — |
| " | 10 | 12 | 11 |
| " | 100 | 54 | 26 |
| " | 1000 | 93 | 32 |

base mud: 0.3% wt Shellflo-S + 4% wt fines.

What is claimed is:

1. An aqueous drilling fluid for use in an environment in which fines are suspended therein, the drilling fluid comprising:
   at least one polymeric component effective to increase the viscosity of the drilling fluid;
   at least one polymeric component effective to reduce fluid loss from the drilling fluid; and
   at least one organic polycationic polymeric component having a molecular weight in the range from 500,000 to 15,000,000 which is effective to from discrete aggregates of the fines in the drilling fluid.

2. A drilling fluid as claimed in claim 1 in which from 1 to 50 g of the polymeric component effective to increase the viscosity of the drilling fluid is present per liter of drilling fluid.

3. A drilling fluid as claimed in claim 1 in which from 1 to 50 g of the polymeric component effective to reduce fluid loss is present per liter of drilling fluid.

4. A drilling fluid as claimed in claim 1 in which from 10 to 5000 ppm wt of the organic polycationic polymeric component which is effective to form discrete aggregates of the fines is present.

5. An aqueous, shale coagulating drilling fluid capable of coagulating shale particles, when used for well operations, comprising a low solids fluid containing a polymeric component effective to increase the viscosity of the drilling fluid and a polymeric component effective to reduce fluid loss in the drilling fluid as well as an organic polycationic polymeric coagulant and flocculant having a molecular weight in the range from 500,000 to 15,000,000.

6. The drilling fluid of claim 5 in which the coagulant and flocculant is a compound of the formula:

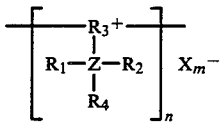

wherein $R_1$ is an organic aliphatic, cycloaliphatic, or aromatic radical containing 2–40 carbon atoms or a hydrogen radical and when $R_1$ is cycloaliphatic Z and $R_2$ can be in the ring;

$R_2$, $R_3$ and $R_4$ are organic radicals independently defined as $R_1$ containing 0–6 carbon atoms and 0–2 oxygen or nitrogen atoms when $R_1$ is cycloaliphatic it may or may not be in the organic polycationic polymer chain; when Z is sulphur $R_4$ is not present;

Z is a cation derived from the group consisting of nitrogen, phosphorous and sulphur;

X is an anion selected from the group consisting of halide, nitrate, sulphate, bisulphate, carbonate, hydroxide, borates, oxides, azides, cyanides and phosphates;

n is an integer equal to the number of monomer units in the polymer required to give a molecular weight in the range of about $5\times10^5$–$15\times10^6$; and m is an integer equal to the number of anions required to maintain electronic neutrality.

* * * * *